United States Patent
Cai

(10) Patent No.: US 8,090,346 B2
(45) Date of Patent: Jan. 3, 2012

(54) CONTROLLING A SHUTOFF/RESTART OF MOBILE VIRTUAL NETWORK OPERATIONS PREPAID SERVICES

(75) Inventor: Yigang Cai, Naperville, IL (US)

(73) Assignee: Alcatel Lucent, Paris (FR)

( * ) Notice: Subject to any disclaimer, the term of this patent is extended or adjusted under 35 U.S.C. 154(b) by 1092 days.

(21) Appl. No.: 11/599,024

(22) Filed: Nov. 14, 2006

(65) Prior Publication Data

US 2008/0113648 A1    May 15, 2008

(51) Int. Cl.
*H04M 11/00* (2006.01)

(52) U.S. Cl. ..... 455/406; 455/408; 455/409; 705/26.41; 705/30; 705/40; 379/114.16; 379/114.17; 379/127.04; 379/127.05

(58) Field of Classification Search ............ 455/409
See application file for complete search history.

(56) References Cited

U.S. PATENT DOCUMENTS

| | | | |
|---|---|---|---|
| 6,104,798 A * | 8/2000 | Lickiss et al. | 379/201.12 |
| 2003/0119478 A1 * | 6/2003 | Nagy et al. | 455/408 |
| 2004/0185830 A1 * | 9/2004 | Joao et al. | 455/410 |
| 2004/0243476 A1 * | 12/2004 | Borenstein et al. | 705/26 |
| 2005/0074014 A1 * | 4/2005 | Rao et al. | 370/395.53 |
| 2005/0108126 A1 * | 5/2005 | Cai et al. | 705/35 |
| 2006/0030315 A1 * | 2/2006 | Smith et al. | 455/432.3 |
| 2008/0051069 A1 * | 2/2008 | Chin | 455/414.1 |
| 2008/0311907 A1 * | 12/2008 | Watson et al. | 455/435.1 |

\* cited by examiner

*Primary Examiner* — Charles Appiah
*Assistant Examiner* — Mazda Sabouri
(74) *Attorney, Agent, or Firm* — Werner Ulrich, Esq.

(57) ABSTRACT

This invention relates to a feature for controlling resellers of telecommunications services. A service provider may freeze the accounts, and therefore service, for all customers of a reseller if that reseller is behind on payments to the service provider. In one preferred embodiment, all customers of a reseller are identified with a reseller identification field in the customer's data stored by the service provider. When the service provider issues a freeze order, the account records for all customers of the reseller, identified by the reseller identification stored for each customer, are set into a frozen state wherein these customers cannot initiate or receive calls; after the frozen state is removed, the various promotions allotted to each customer are reinstated. Advantageously, the threat of freezing service to the customers of the reseller is a potent weapon to force the reseller to pay the service provider.

7 Claims, 5 Drawing Sheets

CONTROLLING A SHUTOFF/RESTART OF MOBILE VIRTUAL NETWORK OPERATIONS PREPAID SERVICES

TECHNICAL FIELD

This invention relates to the provision of prepaid service in mobile virtual network operations.

BACKGROUND OF THE INVENTION

Corporations with well known brand names have a major advantage in the selling of services. One example of the use of this type of advantage is in mobile virtual network operations. A company such as Walmart while having no basic interest in establishing the infrastructure of a mobile telecommunications network would still like to take advantage of the power of its brand to sell mobile telecommunications services.

In one popular mobile virtual network operation business model, the mobile network operator (service provider) teams with a reseller. The reseller approaches customers or is approached by the customers to obtain mobile telecommunications service.

The reseller then notifies the service provider of the identity of the customer and for prepaid customers the type of prepaid arrangement requested by the customer. In prepaid services a customer pays a service provider a fee and the service provider then provides service charging the customer against the pre-provided fee. The end users—wireless prepaid subscribers—pay the reseller for the services. The reseller pays the service provider for wireless infrastructure and customer account management. The reseller owns a customer care center (help desk) which uses software provided by the service provider. When the subscriber calls the help desk, the reseller representative will use the customer care system software to obtain the needed information and update the account information. As the customer makes calls, the charges for the calls are subtracted from a record of the prepaid fee until the customer has exhausted the fee and is asked to provide an additional fee for more service. The fee is usually paid to the reseller through a credit or debit card arrangement, cash, or through some kind of bank transfer arrangement.

The fee is provided to the reseller and the service provider accumulates agreed upon charges against the reseller. Periodically, or according to some other arrangement, the reseller pays the service provider for the services provided.

Since it is the reseller who collects money from the customers and since it is the service provider who collects money from the reseller, a problem of the prior art is that there is no satisfactory arrangement to punish a reseller who does not pay the service provider.

SUMMARY OF THE INVENTION

The above problem is solved and an advance is made over the teachings of the prior art in accordance with Applicant's invention wherein a service provider can stop the provision of service to customers of a reseller by cutting off outgoing, incoming, or both kinds of services to the customers of the reseller in response to a request from the service provider; a data block for each customer of the reseller is initialized to a freeze state which will block all calls from and/or to that customer.

In accordance with one feature of the invention, service can also be denied to the postpaid customers of the reseller.

In accordance with one aspect of Applicant's invention, there is in addition to a freeze request and freeze state, an unfreeze request and a corresponding unfreeze (i.e., normal) state. The unfreeze state is invoked in response to a request from the service provider in response to being paid or receiving some satisfactory explanation and/or guarantee that the service provider will be paid.

In accordance with one preferred embodiment, the customers are informed when a freeze state is invoked and/or when the customers attempt to make an outgoing call. For prepaid service which is time limited or which includes a promotion such as free calls for a limited period of time, the time for customers of resellers who have been frozen out of service for a freeze period is incremented by the freeze period so that these customers do not lose any paid for time or any promotional benefits.

In accordance with another feature of Applicant's invention, when the freeze is invoked (normally during a period of light traffic), customers who are already on a call are allowed to finish that call provided that their account balance remains positive. They are then frozen when they complete that call.

DETAILED DESCRIPTION

Figure 1:
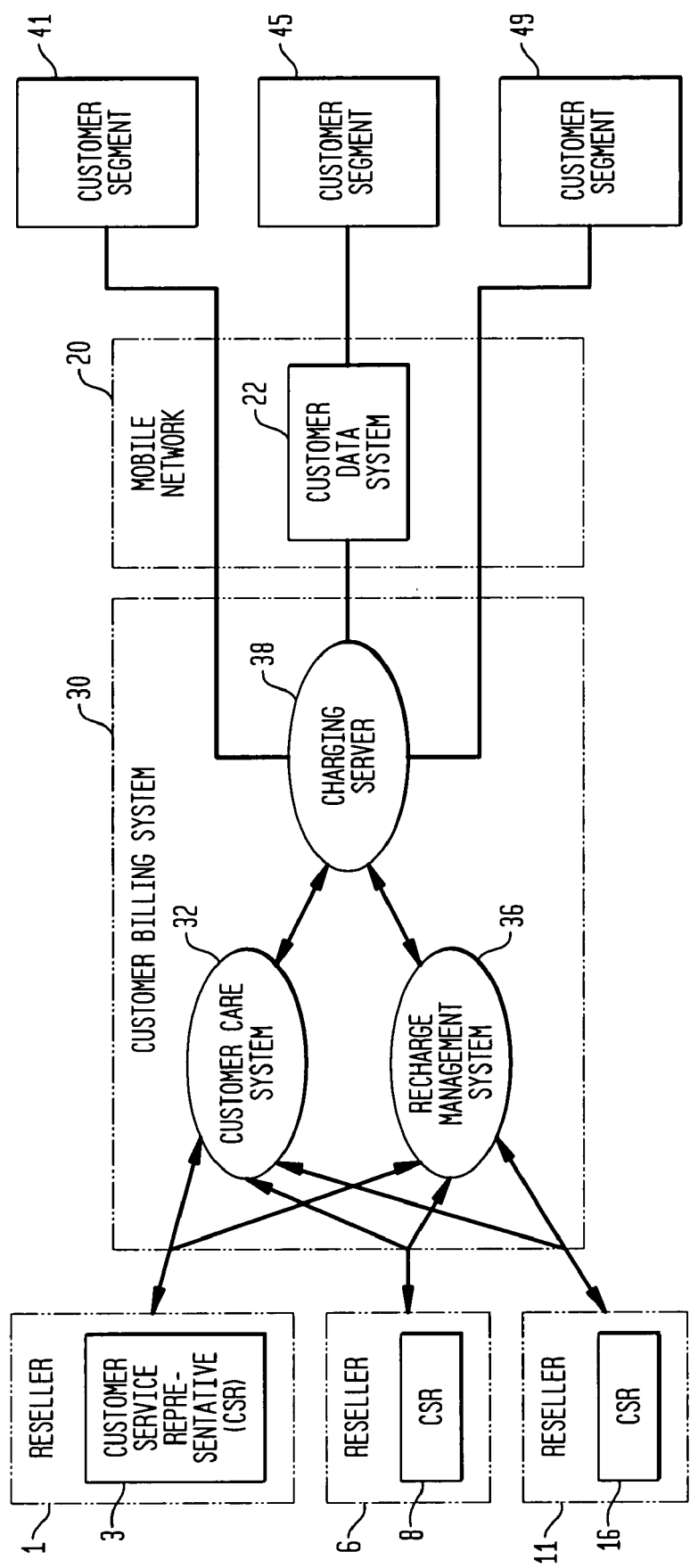
FIG. 1 is a block diagram illustrating the configuration of reseller provided mobile virtual network operations.

FIG. 1 is a block diagram illustrating the configurations of Applicant's invention. Three resellers 1, 6, and 11 all deal with a billing system 30. The core of the billing system is a server, such as Lucent's SurePay™ Server 38. Resellers 1, 6, and 11 have customer service representatives 3, 8, and 13 respectively. These customer service representatives communicate with a customer care system 32 and a recharge management system 36. The recharge management system obtains information about a customer's recharging data provided to the customer service representative. The recharge management system and the customer care system communicate with the charging server 38.

The charging server 38 communicates with mobile network 20 which includes customer data system 22; this system stores the data for all customer segments of reseller 6. In alternative embodiments, the customer data system 22 is integrated into charging server 38, or is a stand-alone system not connected to customer segment 45. Similar units store data for customer segments 41 related to reseller 1 and customer segments 49 relating to customers of reseller 11.

Figure 2:
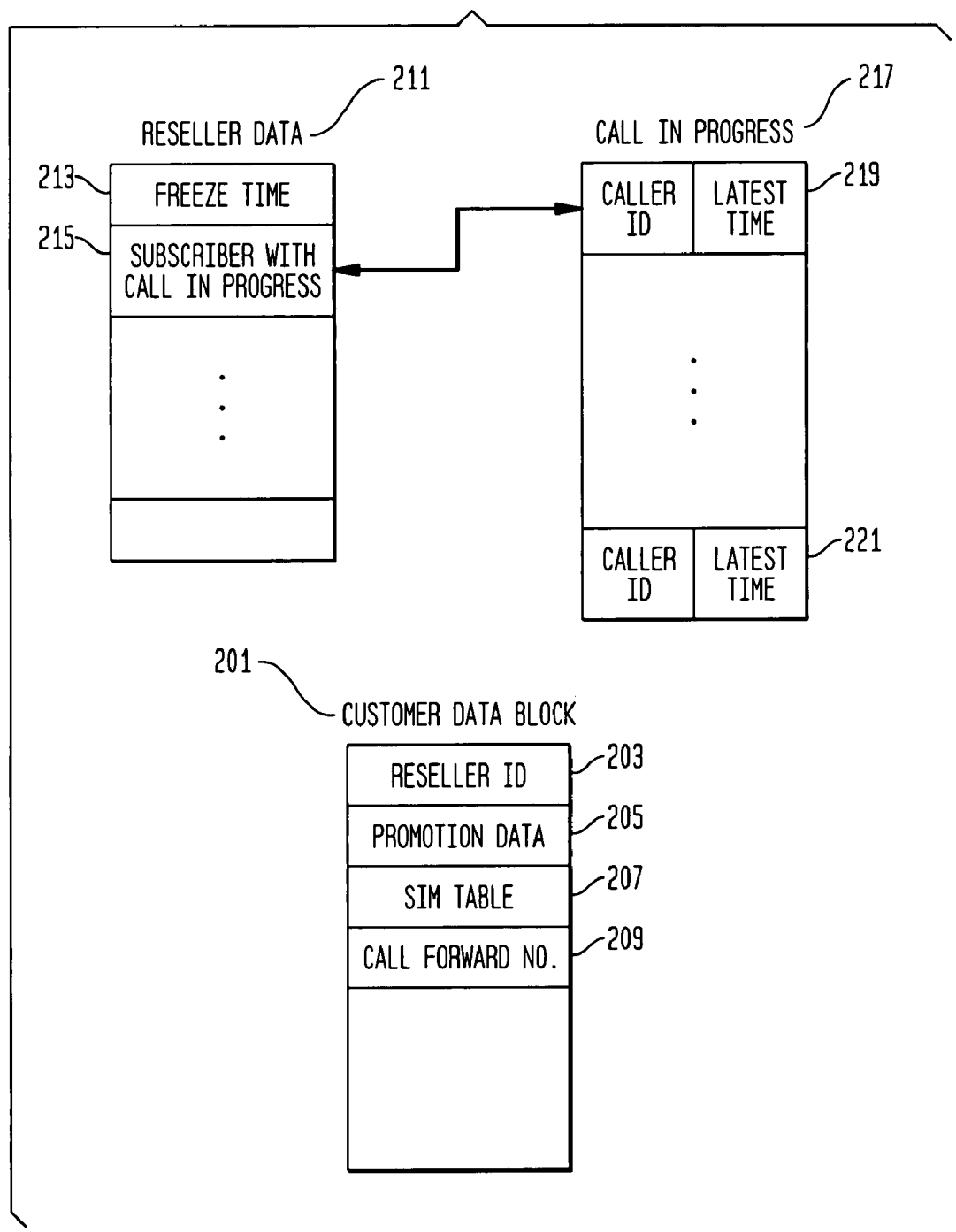
FIG. 2 illustrates the data maintained for individual customers of a reseller and for the reseller.

FIG. 2 is a diagram of pertinent data layouts associated with this invention. Block 201 is a customer data block describing the services of a customer. In particular, and with respect to this invention, block 201 has been enhanced from the teachings of the prior art by the addition of a field 203 for storing the reseller's identification. Block 205 contains promotion data for the customer, such as special rates for special times, and the interval for which the promotion is active. It also contains a subscriber information module (SIM) table 207 that has basic customer information such as the directory number, mobile identification number, account identifier, class of service, currency and language label, primary and secondary balance, (customers may have more than one account), time last recharged, personal identification number (PIN) and call forwarding information. A call forwarding number for use when a customer is in the freeze state is stored in location 209.

Block 211 contains data for the reseller. Field 213 stores the freeze time for that reseller and field 215 is a pointer to a block 217 for storing information about subscriber calls in progress. The block which contains this subscriber call in progress information contains a plurality of entries 219, . . . , 221 for all calls in progress at the time that the freeze was invoked. For each call in progress, a caller identification is stored and the most recent time that this caller was checked to see if the caller had completed the call in progress at the time of the freeze had been completed. When the call is completed, this entry is deleted from the file of calls in progress. When the subscriber is frozen, the subscriber lifecycle data which stores promotion data for the customer at the frozen time should be also be preserved for future recovery. For example, in the SurePay system, dynamic data of a subscriber stored in the customer data block 201 has fields, such as phone number, class of service, etc. The freeze state is an existing field in SurePay.

Figure 3:
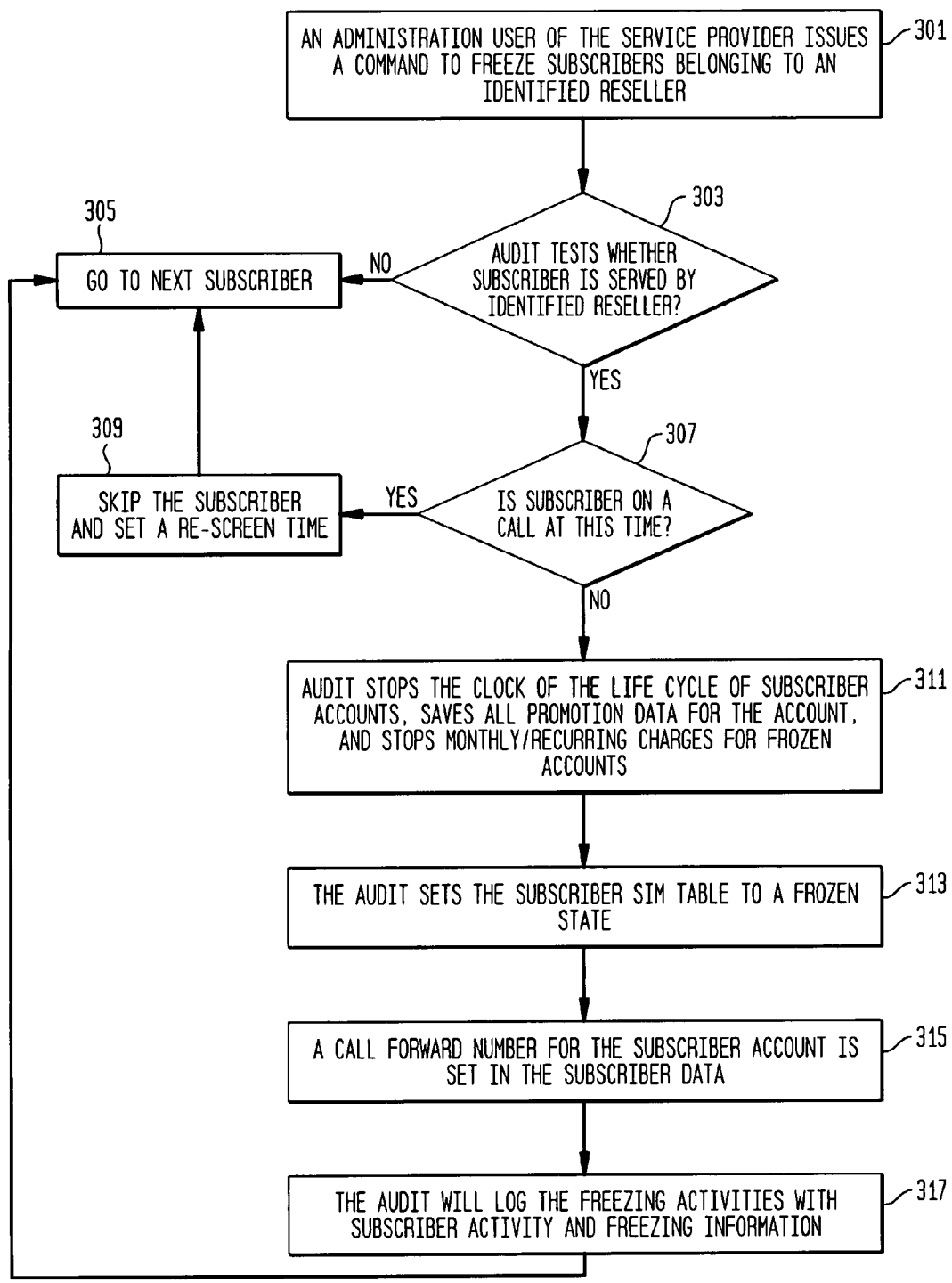
FIGS. 3-6 are flow diagrams illustrating the operation of Applicant's invention.

FIG. 3 is a flow diagram illustrating the operations of freezing service to the customers of a reseller. An administration user of the service provider issues a command to freeze subscribers belonging to the reseller whose subscribers are to be frozen (action block 301). The audit tests (test 303) whether a subscriber is served by the identified reseller by examining the reseller identification field 203 (FIG. 2). If the subscriber is not served by the identified reseller, the audit tests the next subscriber (action block 305). If the subscriber is served by the identified reseller, test 307 checks whether the subscriber is on a call at this time. If so, the audit will skip the subscriber, set a rescreen time and go on to the next subscriber (action block 309). If the subscriber is served by the identified reseller and is not on a call, the audit stops the clock of the life cycle of the subscriber account, saves all promotion data for the account and stops monthly/recurring charges for such frozen accounts (action block 311). The audit also sets the subscriber SIM (Subscriber Information Module) table to a frozen state (action block 313). A call forwarding number for forwarding incoming calls while the subscriber is in the frozen state, is also set in field 209 of the subscriber data block 201 (action block 315). The audit will also log all freezing activities with subscriber activity and freezing information (action block 317), so that there is data for the service provider to examine the execution of freezing. The audit continues until all subscribers, including those on calls at the time of the freeze, have been audited. The customers of the reseller being frozen are notified either at the time of the freeze or when they attempt to make a call. (See discussion of FIG. 6.)

During the freeze period, all activities against this account are suspended. For any incoming and outgoing calls, charging server 38 will check to see if the customer's account is frozen and if it is frozen the call is blocked. Incoming calls may be forwarded to the call forwarding number specified in the called customer's data block in order to notify the caller of the present situation. Alternatively, only incoming calls may be allowed, and even these may be limited in time, or may be blocked after lapse of a predetermined interval.

Figure 4:
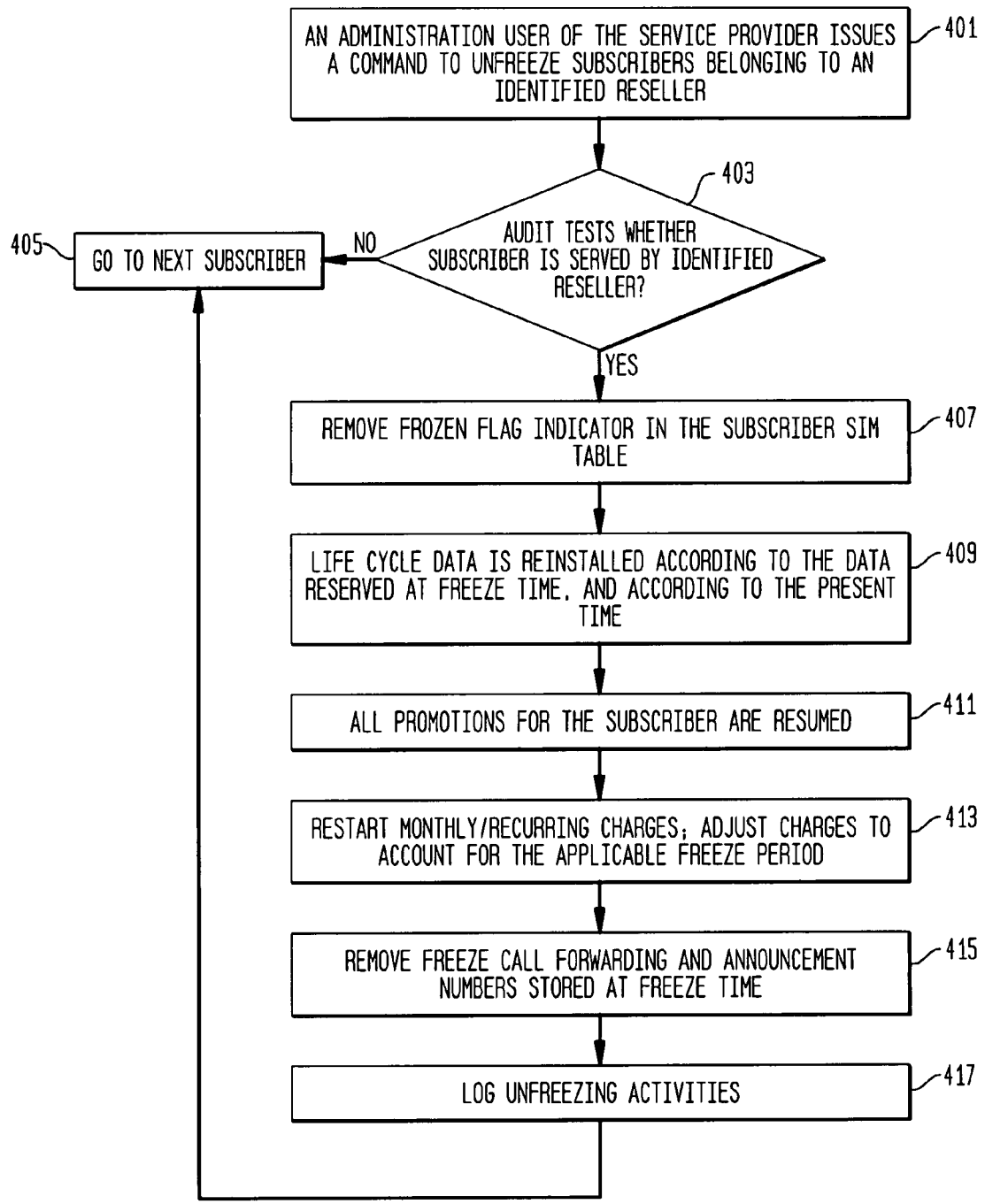

FIG. 4 is a flow diagram illustrating the operations performed during an unfreezing. An administration user of the service provider issues a command to unfreeze subscribers belonging to the reseller (action block 401). The audit tests whether a subscriber is served by the identified reseller (test 403). If not, the audit goes to the next subscriber (action block 405). For subscribers served by the identified reseller, the audit will remove the frozen flag indicator in the subscriber SIM table and set the freezing time stamp to null (action block 407). The life cycle data is reinstalled according to the data reserved at the freeze time and according to the present time (action block 409). The audit resumes all promotions provided to this account (action block 411). The audit restarts monthly/recurring charges for the account and adjusts the charge to account for the applicable freeze period (action block 413). The audit removes freezing call forwarding and announcement numbers stored at the time of the freeze (action block 415). Finally, the audit will log the unfreezing activities with subscriber and unfreezing data (action block 417) to allow the service provider and reseller to examine. The charging server will notify a notification entity to send an announcement to the customer for the unfreezing. The announcement could be a voice call, SMS (Short Message Service) or email.

As a result of the above operations, customers of a reseller may have their service frozen in response to a first command from an administrator of the service provider and unfrozen in response to a second command from the service provider. Advantageously, this kind of arrangement provides the type of meaningful threat which a service provider needs to ensure that resellers continue to pay.

Figure 5:
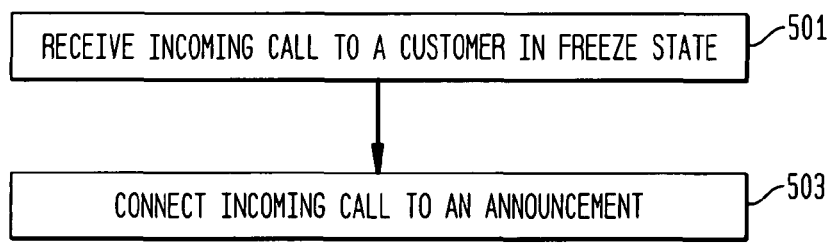

FIG. 5 is a flow diagram illustrating actions performed when an incoming call is received to a customer in the freeze state. An incoming call is received (action block 501). The call is routed to an announcement (action block 503) or to some other number specified in call forwarding number field 209 (FIG. 2). The announcement indicates the frozen state of the called party and may also provide a telephone number for reaching a service desk of the reseller. Calls from and to the reseller service desk will not be blocked when the reseller is placed in the frozen state. Calls from a service desk of the service provider to a customer in the frozen state will not be blocked, so that emergencies can be served.

Figure 6:
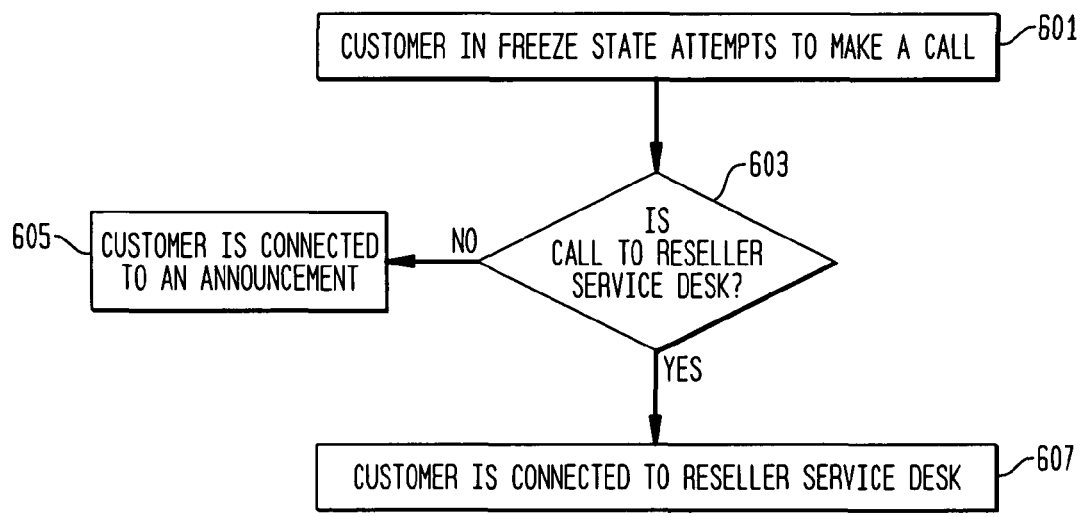

FIG. 6 is a flow diagram illustrating the actions performed when a customer in the frozen state attempts to make a call (action block 601). The system tests whether the call is to a reseller service desk (test 603). If the customer is not calling the service desk, the customer is connected to an announcement (action block 605). If the customer is calling the service desk, he/she is connected to the reseller's service desk.

In addition, it is necessary to notify all affected customers when service is frozen or unfrozen. This can be done via an announcement or e-mail at the time of the freeze or unfreeze, and/or by connecting a frozen customer to an announcement when he/she attempts to make a call.

For postpaid customers of the reseller, the principles of this invention are also applicable. For such customers, it is important that the freeze interval be recorded so that these customers are not charged for the interval when they have no service. The freeze interval can be recorded in the reseller data block, and can be read when bills are being prepared.

Since it is in the interest of the service provider to continue to obtain revenue during freeze periods, the customers of the service provider can be permitted to call reseller customers when the reseller's service is frozen.

In the preferred embodiment of Applicant's invention, customers served by a particular reseller, or by a reseller group treated as one entity for the purposes of freezing customers, are identified in a field of the customer's data block. Alternatively, customers can be identified by being on a stored table of customers served by the reseller; a range of directory numbers or Internet Protocol (IP) addresses; a domain name (e.g., Walmart.com or apple.com); or any other recognizable grouping for the customers of a particular reseller. Once a customer has been identified as being served by a reseller whose customers are being frozen or unfrozen, the actions to freeze or unfreeze an individual customer account can be performed. The actions taken on incoming or outgoing calls are controlled by the freeze state indicator in the customer data block.

The above description is of one preferred embodiment of Applicant's invention.

I claim:

1. A telecommunications system comprising:
   a reseller for receiving payments from customers of said reseller;
   a customer billing system for calculating and accumulating charges for telecommunications calls made by said customers; and
   a service provider network for connecting calls made to or from said customers;
   said reseller for paying said service provider for telecommunications services provided to said customers of said reseller;
   wherein each customer of said reseller has a data block in said service provider network for identifying said reseller and for storing accounting data for said customer;
   means, responsive to a recognition by an administrator of said service provider network that said reseller is delinquent in payments to said service provider, for sending a first message to said service provider;
   means, responsive to reception of said first message for freezing accounts of prepaid account customers of said reseller;
   means, responsive to reception of said first message for denying incoming and outgoing service to customers having frozen accounts;
   a reseller data block for identifying all customers of said reseller with a call in progress at the time said first message is received;
   means for permitting said calls in progress to be completed prior to denying incoming and outgoing service to said customers having calls in progress at the time said first message is received;
   means, responsive to receipt of a second request message from said administrator for unfreezing the accounts of said prepaid account customers and restoring incoming and outgoing service to said prepaid account customers.

2. The apparatus of claim 1 further comprising means for notifying customers of said reseller during the freeze period.

3. The apparatus of claim 1 wherein said means for freezing customer accounts adjust said customer accounts for the freeze interval.

4. The apparatus of claim 1 wherein said means for denying permit incoming calls to customers with frozen accounts.

5. The apparatus of claim 1 wherein said means for denying permit incoming calls to customers having frozen accounts from callers served by said service provider.

6. The apparatus of claim 1 wherein said means for denying permit calls from a service desk of said service provider to customers having a frozen account.

7. The apparatus of claim 1 wherein said identified customers of a reseller whose accounts are frozen further comprise postpaid customers.

* * * * *